US012301469B2

(12) United States Patent
Kanamarlapudi et al.

(10) Patent No.: US 12,301,469 B2
(45) Date of Patent: May 13, 2025

(54) TECHNIQUES FOR IMPROVING PACKET DATA CONVERGENCE PROTOCOL REORDERING CONFIGURATION

(71) Applicant: QUALCOMM Incorporated, San Diego, CA (US)

(72) Inventors: Sitaramanjaneyulu Kanamarlapudi, San Diego, CA (US); Leena Zacharias, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/445,460

(22) Filed: Aug. 19, 2021

(65) Prior Publication Data
US 2022/0060425 A1 Feb. 24, 2022

Related U.S. Application Data

(60) Provisional application No. 62/706,517, filed on Aug. 21, 2020.

(51) Int. Cl.
H04L 47/34 (2022.01)
H04L 41/0896 (2022.01)
H04L 47/28 (2022.01)
H04L 47/283 (2022.01)

(52) U.S. Cl.
CPC .......... H04L 47/34 (2013.01); H04L 41/0896 (2013.01); H04L 47/28 (2013.01); H04L 47/283 (2013.01)

(58) Field of Classification Search
CPC ..... H04L 47/00; H04L 41/0896; H04L 47/27; H04L 47/283; H04L 47/34; H04L 47/28
See application file for complete search history.

(56) References Cited

U.S. PATENT DOCUMENTS

| 9,769,228 | B2* | 9/2017 | Bi .......................... H04L 65/611 |
| 10,440,767 | B2* | 10/2019 | Nagasaka ........... H04W 36/305 |
| 2007/0291695 | A1* | 12/2007 | Sammour ........... H04W 36/362 370/331 |
| 2010/0274921 | A1* | 10/2010 | Lerzer ................... H04W 80/02 709/234 |
| 2012/0294281 | A1* | 11/2012 | Park ...................... H04L 1/1848 370/328 |

(Continued)

FOREIGN PATENT DOCUMENTS

WO WO-2017192138 A2 11/2017
WO WO-2019204311 A1 10/2019

OTHER PUBLICATIONS

International Search Report and Written Opinion—PCT/US2021/071238—ISA/EPO—Dec. 13, 2021.

Primary Examiner — Raj Jain
(74) Attorney, Agent, or Firm — Dalei Dong; Harrity & Harrity, LLP

(57) ABSTRACT

Various aspects of the present disclosure generally relate to wireless communication. In some aspects, a user equipment (UE) may determine, during a packet data convergence protocol (PDCP) reordering timer period, whether one or more packet transfer criteria are satisfied. The UE may transfer, during the PDCP reordering timer period, one or more packets from a reordering window based at least in part on a determination that the one or more packet transfer criteria are satisfied. Numerous other aspects are provided.

30 Claims, 6 Drawing Sheets

(56) References Cited

U.S. PATENT DOCUMENTS

| | | | |
|---|---|---|---|
| 2013/0044604 A1* | 2/2013 | Hatley | H04L 43/10 |
| | | | 370/241 |
| 2016/0050609 A1* | 2/2016 | Erickson | H04W 48/18 |
| | | | 370/331 |
| 2017/0289025 A1* | 10/2017 | Cheng | H04L 1/0018 |
| 2018/0198566 A1 | 7/2018 | Yi et al. | |
| 2020/0092719 A1* | 3/2020 | Kim | H04W 12/45 |
| 2020/0092939 A1* | 3/2020 | Kim | H04W 76/30 |
| 2020/0100324 A1* | 3/2020 | Wittberg | H04W 24/02 |
| 2020/0137113 A1* | 4/2020 | Thomas | H04L 41/0895 |
| 2020/0169509 A1* | 5/2020 | Tigli | H04L 47/2483 |
| 2021/0029226 A1* | 1/2021 | Hsu | H04L 69/321 |
| 2021/0099395 A1* | 4/2021 | Bjornstad | H04L 47/283 |
| 2022/0060425 A1* | 2/2022 | Kanamarlapudi | H04L 47/28 |

\* cited by examiner

TECHNIQUES FOR IMPROVING PACKET DATA CONVERGENCE PROTOCOL REORDERING CONFIGURATION

CROSS-REFERENCE TO RELATED APPLICATION

This patent application claims priority to U.S. Provisional Patent Application No. 62/706,517, filed on Aug. 21, 2020, entitled "TECHNIQUES FOR IMPROVING PACKET DATA CONVERGENCE PROTOCOL REORDERING CONFIGURATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for improving packet data convergence protocol reordering configuration.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining, during a packet data convergence protocol (PDCP) reordering timer period, whether one or more packet transfer criteria are satisfied; and transferring, during the PDCP reordering timer period, one or more packets from a reordering window based at least in part on a determination that the one or more packet transfer criteria are satisfied.

In some aspects, transferring one or more packets from the reordering window includes delivering a first subset of packets from the reordering window while an order of a second subset of packets from the reordering window is maintained, where the first subset of packets occurs within a sequence of the order of the second subset of packets.

In some aspects, the first subset of packets is selected based at least in part on the one or more packet transfer criteria.

In some aspects, determining whether the one or more packet transfer criteria are satisfied includes determining whether a first size of the PDCP reordering timer exceeds a second size of a flow characteristic parameter by a size threshold.

In some aspects, the flow characteristic parameter is at least one of: a jitter parameter, a packet delay parameter, or a latency parameter.

In some aspects, determining whether the one or more packet transfer criteria are satisfied includes determining whether a loss recovery procedure is configured for the one or more packets.

In some aspects, the loss recovery procedure uses at least one of forward error correction, a network coding, or fountain codes.

In some aspects, determining whether the one or more packet transfer criteria are satisfied includes determining whether a type of data traffic, of the one or more packets, matches a specified type of data traffic.

In some aspects, transferring the one or more packets includes transferring the one or more packets based at least in part on at least one of: a latency characteristic of the one or more packets, or a reliability characteristic of the one or more packets.

In some aspects, the method includes detecting, based at least in part on a set of sequence numbers of a set of received packets, a missed packet of a sequence of packets; starting the PDCP reordering timer period based at least in part on the detection of the missed packet; and determining whether the one or more packet transfer criteria are satisfied includes determining that the missed packet has not been recovered within a threshold period of time of starting the PDCP reordering timer. In some aspects, determining whether the one or more packet transfer criteria are satisfied includes determining that the missed packet has not been recovered within a threshold period of time of starting the PDCP reordering timer.

In some aspects, determining whether the one or more packet transfer criteria are satisfied includes determining whether the one or more packet transfer criteria are satisfied based at least in part on at least one of: a quality of service identifier, a guaranteed bit rate parameter, an aggregated maximum bit rate parameter, a reliability parameter, or a received host indication.

In some aspects, the method includes providing a set of packets associated with a particular data flow based at least in part on the determination of whether the one or more packet transfer criteria are satisfied.

In some aspects, the particular data flow is determined based at least in part on at least one of a flow identifier, a traffic identifier, or a payload.

In some aspects, the method includes determining one or more flow characteristics based at least in part on a packet parameter of at least one packet; and determining whether the one or more packet transfer criteria are satisfied includes determining whether the one or more packet transfer criteria are satisfied based at least in part on the one or more flow characteristics. In some aspects, determining whether the one or more packet transfer criteria are satisfied includes determining whether the one or more packet transfer criteria are satisfied based at least in part on the one or more flow characteristics.

In some aspects, the packet parameter includes at least one of: a PDCP header, a service data adaptation protocol header, an internet protocol tuple, or a robust header compression parameter.

In some aspects, a UE for wireless communication includes a memory and one or more processors coupled to the memory, the memory and the one or more processors configured to: determine, during a PDCP reordering timer period, whether one or more packet transfer criteria are satisfied; and transfer, during the PDCP reordering timer period, one or more packets from a reordering window based at least in part on a determination that the one or more packet transfer criteria are satisfied.

In some aspects, a non-transitory computer-readable medium storing a set of instructions for wireless communication includes one or more instructions that, when executed by one or more processors of a UE, cause the UE to: determine, during a PDCP reordering timer period, whether one or more packet transfer criteria are satisfied; and transfer, during the PDCP reordering timer period, one or more packets from a reordering window based at least in part on a determination that the one or more packet transfer criteria are satisfied.

In some aspects, an apparatus for wireless communication includes: means for determining, during a PDCP reordering timer period, whether one or more packet transfer criteria are satisfied; and means for transferring, during the PDCP reordering timer period, one or more packets from a reordering window based at least in part on a determination that the one or more packet transfer criteria are satisfied.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
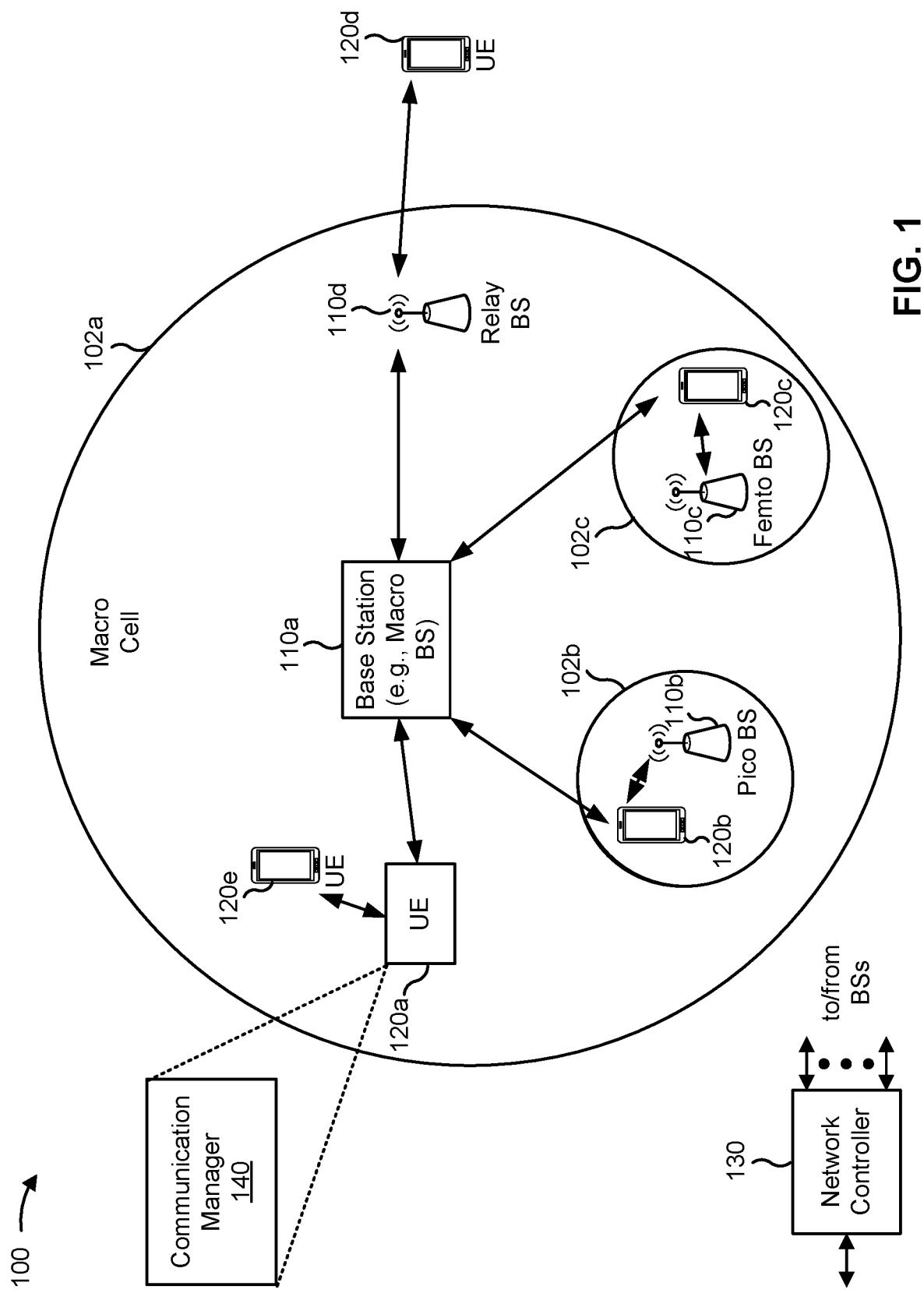
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine, during a packet data convergence protocol (PDCP) reordering timer period, whether one or more packet transfer criteria are satisfied; and transfer, during the PDCP reordering timer period, one or more packets from a reordering window based at least in part on a determination that the one or more packet transfer criteria are satisfied. Additionally, or alternatively, the communication manager 140 may perform one or more other operations described herein.

As indicated above, FIG. 1 is provided as an example. Other examples may differ from what is described with regard to FIG. 1.

Figure 2:
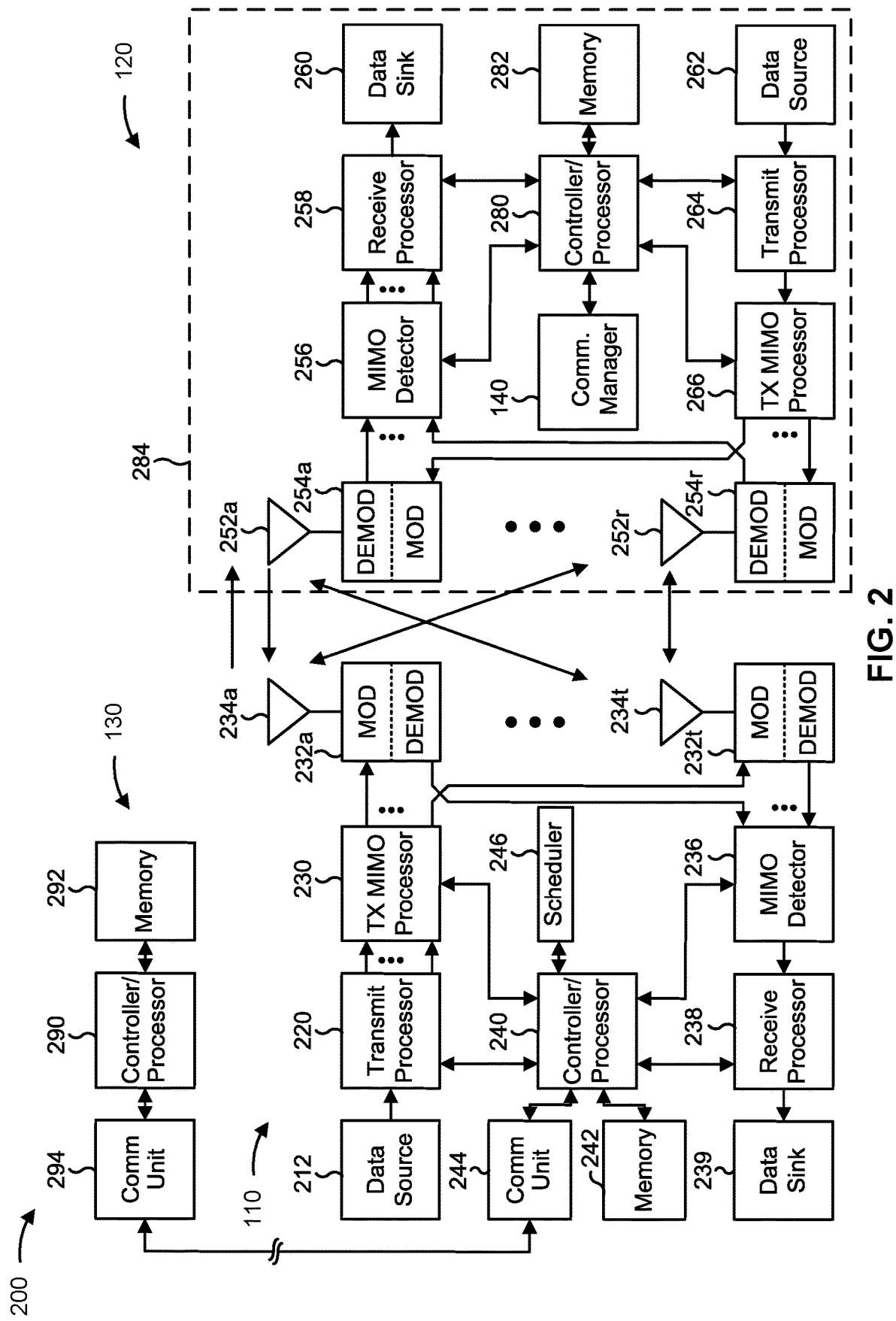
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, the controller/processor 280 of the UE 120, and/or any other component(s) of FIG. 2 may perform one or more techniques associated with improving PDCP reordering configuration, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some examples, executing instructions may include running the instructions, converting the instructions, compiling the instructions, and/or interpreting the instructions, among other examples.

In some aspects, a UE (e.g., the UE 120) includes means for determining, during a PDCP reordering timer period, whether one or more packet transfer criteria are satisfied; and/or means for transferring, during the PDCP reordering timer period, one or more packets from a reordering window based at least in part on a determination that the one or more packet transfer criteria are satisfied. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

As indicated above, FIG. 2 is provided as an example. Other examples may differ from what is described with regard to FIG. 2.

Figure 3:
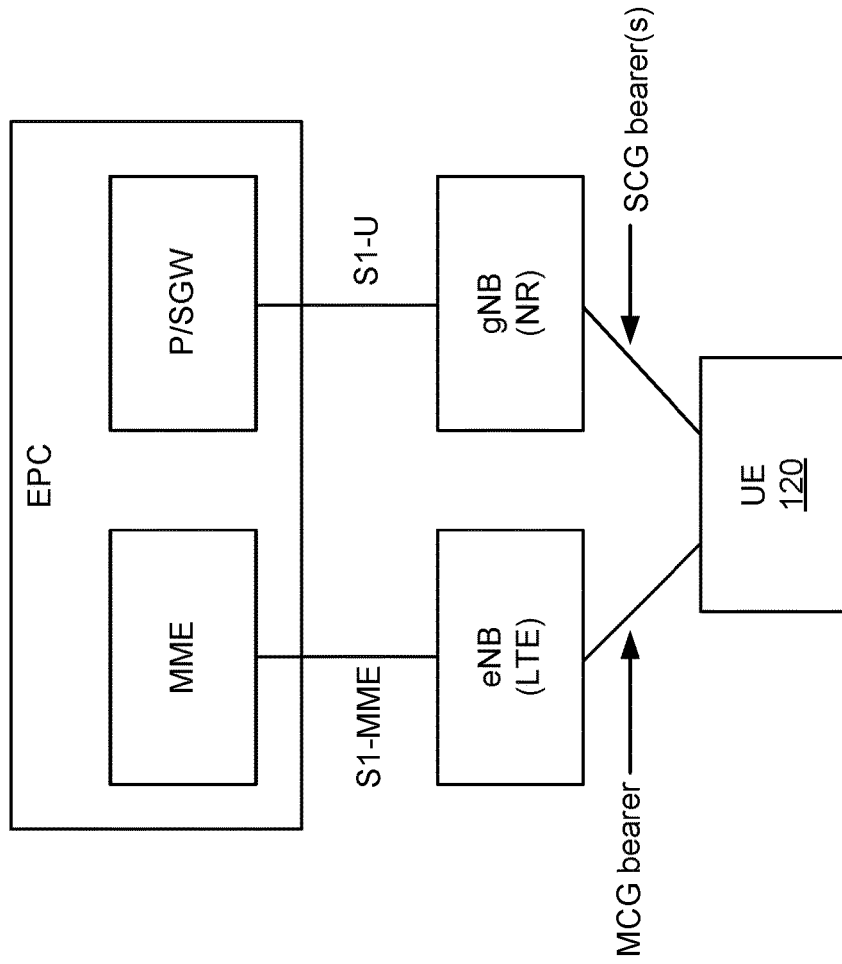
FIG. 3 is a diagram illustrating an example of dual connectivity, in accordance with the present disclosure.

FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, a NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 3, the PGW and the SGW are shown collectively as P/SGW. The eNB and the gNB may be co-located at the same base station 110. Alternatively, the eNB and the gNB may be included in different base stations 110 (e.g., may not be co-located).

As further shown in FIG. 3, in some aspects, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, the UE 120 may communicate with the eNB via the MCG, and may communicate with the gNB via the SCG. The MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). The gNB and the eNB may not transfer user plane information between one another. A UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). The MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs. A radio bearer may be dedicated to a specific cell group (e.g., a radio bearer may be an MCG bearer, an SCG bearer, and/or the like). A radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). A DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

In some communication systems, traffic may be transferred between different protocol stack layers within a UE as part of traffic transfer between the UE and other network devices, such as other UEs, BSs, and/or the like. For example, a radio link control (RLC) entity of a UE may transfer packets to a packet data convergence protocol (PDCP) entity of the UE. In LTE, packets transferred from the RLC entity to the PDCP entity may be in sequence; however, in NR, packets may be out of sequence. Thus, the UE may use a PDCP reordering timer and a reordering window to manage out of sequence traffic received at the PDCP entity from the RLC entity.

In this case, the UE sets the PDCP reordering timer when an out of sequence packet is detected (e.g., based at least in part on an out of sequence protocol data unit (PDU) sequence number (SN), indicating a missing packet with a missing PDU SN). During the PDCP reordering timer, the UE holds one or more received packets. If the missing packet with the missing PDU SN is received for transfer to the PDCP entity during the reordering window, the UE proceeds with transferring the held one or more received packets to an application running on a host (e.g., before the reordering window expires).

At a user plane, devices, such as the UE, a BS, and/or the like, may have a plurality of interfaces, such as a user plane function (UPF)-RAN interface, a RAN-RAN interface, and/or the like. The UE may use NR-user plane (NR-U) protocol to manage packet transfers on the user plane and obtain information regarding successful packet delivery. Similarly, the UE may use general packet radio service (GPRS) tunneling protocol (GTP) user plane (GTP-U). GTP-U may not guarantee successful delivery, but may include signaling to indicate whether a packet has been lost and to cause retransmission of lost packets.

However, as a result of prematurely transferring the held one or more received packets to the PDCP entity, some packets may be out of sequence at the PDCP level relative to the RLC SN. For example, transferring PDCP packets (which may be termed "flushing") without the full PDCP reordering timer period elapsing may result in one or more of the transferred packets being declared as lost, according to the NR-U protocol and GTP-U protocol. As a result, the UE may attempt to recover the one or more packets at an application layer. However, unnecessarily attempting to recover the one or more packets may result in the packets being subsequently dropped as out-of-window (e.g., received outside of the reordering window), result in excessive transmission control protocol (TCP) retransmission requests, and/or the like, which may cause poor UE and/or network performance.

Some aspects described herein provide techniques for improving a PDCP reordering configuration. For example, before transferring packets from a reordering window, a UE may determine whether one or more packet transfer criteria are satisfied, such as whether the PDCP reordering timer has a relatively large size relative to a jitter requirement, whether the application layer includes procedures for loss tolerance (e.g., whether forward error correction is configured), and/or the like. In this case, when the one or more transfer criteria are satisfied for a particular bearer, the UE may transfer the one or more packets from the reordering window to an upper layer, which may be termed 'flushing' the one or more packets.

Figure 4:
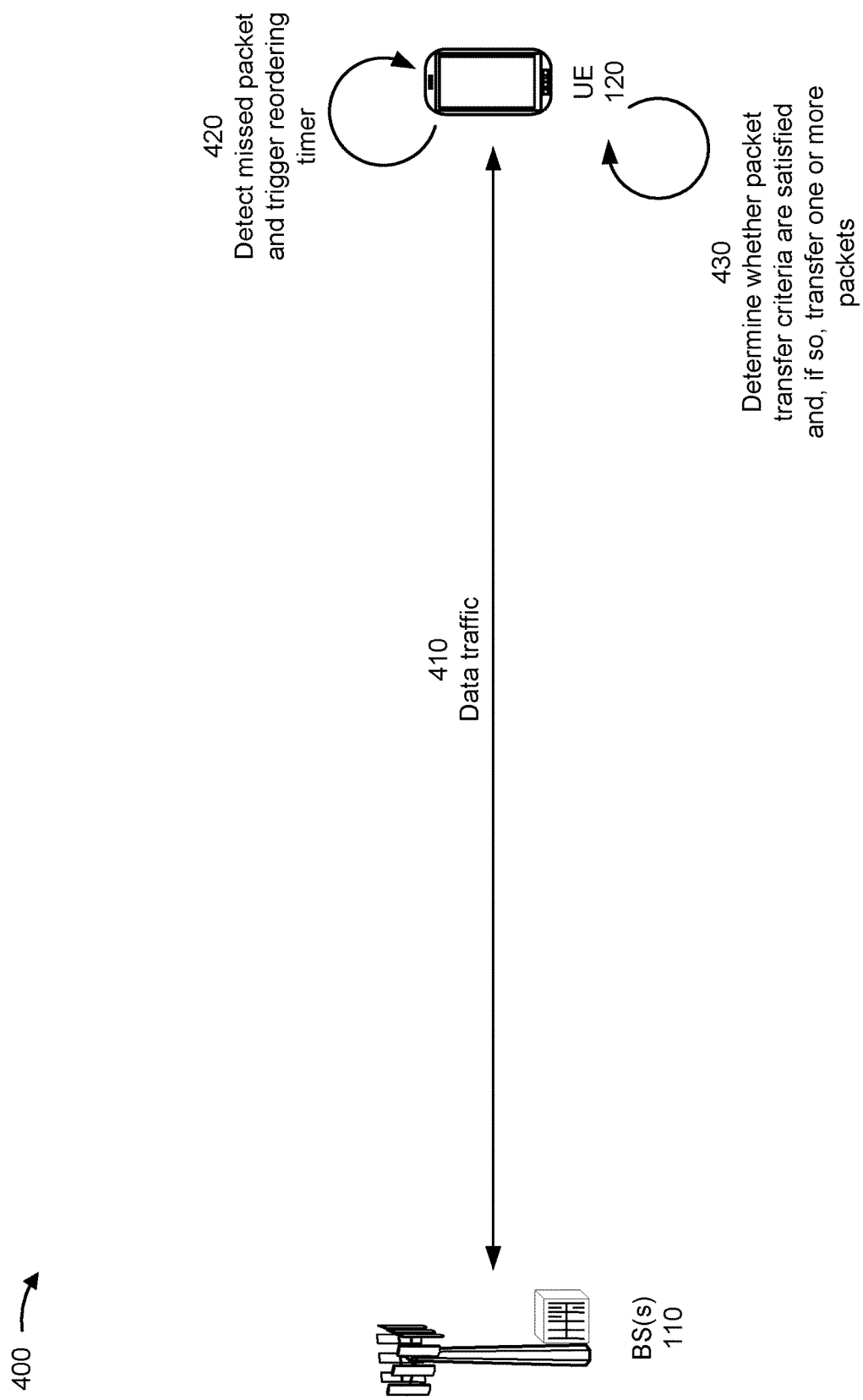
FIG. 4 is a diagram illustrating an example associated with improving packet data convergence protocol (PDCP) reordering configuration, in accordance with the present disclosure.

FIG. 4 is a diagram illustrating an example 400 of improving PDCP reordering configuration, in accordance with the present disclosure. As shown in FIG. 4, one or more BSs 110 (e.g., based at least in part on whether UE 120 is operating in a single connectivity mode or a dual connectivity mode) and a UE 120 may communicate with each other. Although some aspects are described in terms of a UE 120 communicating with a base station 110, some aspects may include a first UE 120 communicating with a second UE 120.

As further shown in FIG. 4, and by reference number 410, UE 120 and a base station 110 may communicate data traffic. For example, UE 120 and a base station 110 may have one or more bearers established for data traffic between UE 120 and base station 110. In some aspects, the data traffic may be a particular traffic type, such as real-time video traffic, voice-calling traffic, and/or the like.

As further shown in FIG. 4, and by reference number 420, UE 120 may detect a missed packet and trigger a reordering timer. For example, UE 120 may monitor a set of RLC SNs of packets arriving at a PDCP layer from an RLC layer and may determine that an RLC SN is missing. In other words, the RLC SNs associated with the one or more packets are sequential, and if consecutively received RLC SNs are not consecutively numbered RLC SNs, UE 120 may determine that there is a missing RLC SN corresponding to a missing packet. In this case, UE 120 may start a PDCP reordering timer associated with a reordering window to enable UE 120 to gather one or more packets received out of sequence after detecting the missing packet.

As further shown in FIG. 4, and by reference number 430, UE 120 may determine whether to prematurely transfer one or more packets from the reordering window. For example, UE 120 may determine whether a set of packet transfer criteria are satisfied and, if so, transfer one or more packets. In some aspects, UE 120 may determine whether a packet transfer criterion is satisfied based at least in part on a relative size of the PDCP reordering timer. For example, UE 120 may determine whether a first size of the PDCP reordering timer (e.g., 500 milliseconds (ms)) exceeds a second size of a jitter requirement (e.g., 200 ms) by a threshold amount, a threshold proportion, and/or the like. In this case, when the PDCP reordering timer is large relative to the jitter requirement, UE 120 may determine to transfer one or more packets out of the reordering window (e.g., flush the one or more packets). Additionally, or alternatively, UE 120 may determine whether the PDCP reordering timer is large relative to another parameter, such as a packet delay requirement, a latency requirement, and/or the like.

In some aspects, UE 120 may determine whether a packet transfer criterion is satisfied based at least in part on a presence of a loss recovery procedure. For example, UE 120 may analyze the one or more packets to determine a type of the one or more packets (e.g., streaming video encoded using a particular video encoding technique) and may determine whether the type of the one or more packets includes loss recovery techniques. As an example, when the one or more packets are encoded video, UE 120 may determine whether the video encoding scheme for the one or more packets includes forward error correction (FEC) information to enable information loss recovery. Additionally, or alternatively, UE 120 may determine whether the one or more packets include information associated with network coding or fountain codes to enable information loss recovery. In this case, when a loss recovery procedure is available, UE 120 may transfer the one or more packets and the loss recovery procedure may be used (e.g., by an entity of UE 120 or by an endpoint of a bearer, such as base station 110).

In some aspects, UE 120 may determine whether a packet transfer criterion is satisfied based at least in part on a type of data traffic with which the one or more packets are associated. For example, when UE 120 is communicating real time video data, UE 120 may determine that satisfying an application latency requirement is more important that satisfying a data reliability requirement. In this case, UE 120 may determine to transfer the one or more packets out of the reordering window to ensure that the application latency requirement is satisfied.

In some aspects, UE 120 may determine whether a packet transfer criterion is satisfied based at least in part on a timing characteristic. For example, UE 120 may determine that a missed packet associated with a missed RLC SN that triggered the reordering timer has not been recovered within a threshold period of time. In other words, when UE 120 triggers a reordering timer of 500 ms based at least in part on detecting a missed packet, but does not recover the missed packet within 150 ms of a start of the reordering window, UE 120 may determine to transfer the one or more packets out of the reordering window. In contrast, if UE 120 recovers the missed packet 450 ms after the start of the reordering window, UE 120 may determine to discard the missed packet as the PDCP window has already been moved.

In some aspects, UE 120 may determine whether a packet transfer criterion is satisfied based at least in part on a flow characteristic. For example, UE 120 may analyze a PDCP payload (e.g., to determine whether a traffic type is Internet Protocol (IP) traffic, ethernet traffic, unstructured traffic (for cellular V2X (CV2X) scenarios), and/or the like), a service data adaptation protocol (SDAP) header (e.g., to determine a flow identifier), an IP tuple or ethernet tuple (e.g., for source or destination address information, port information, protocol information, virtual local area network (VLAN) information, and/or the like), and/or the like. Additionally, or alternatively, UE 120 may analyze robust header compression traffic (e.g., to determine flow level characteristics). In some aspects, UE 120 may determine a quality of service identifier (e.g., a 5G quality of service identifier (5QI)), a guaranteed bit rate (GBR), an aggregated maximum bit rate (AMBR), a reliability parameter, and/or the like. Additionally, or alternatively, UE 120 may receive an indication from a host that is running an application that is generating the one or more packets of a flow characteristic. In this case, based at least in part on the flow characteristic, UE 120 may determine whether to transfer packets out of the reordering window.

In some aspects, UE 120 may use a plurality of packet transfer criteria. For example, UE 120 may determine whether the reordering timer is relatively large and whether the one or more packets are associated with a loss recovery procedure. Additionally, or alternatively, UE 120 may determine whether another combination of one, two, three, . . . , all, etc. of the aforementioned packet transfer criteria are satisfied. Additionally, or alternatively, UE 120 may determine whether other types of packet transfer criteria are satisfied. Based at least in part on determining that one, multiple, all, or another configuration of packet transfer criteria is satisfied, UE 120 (a PDCP entity thereof) may transfer packets from the reordering window before the PDCP reordering timer has elapsed for a particular RLC SN. In some aspects, UE 120 may transfer a first subset of packets from the reordering window and maintain a second subset of packets in the reordering window. For example, UE 120 may have packets F1, F2, and F3 on the same resource block (RB) (in order), and may transfer packets F2 while maintaining packets F1 and F3 in the reordering window. In this way, UE 120 may achieve a packet transfer criterion for packets F2 (e.g., a latency requirement) that is not associated with packets F1 and F3 (e.g., which may be associated with different packet transfer criteria based at least in part on which UE 120 may subsequently transfer from the reordering window).

Additionally, or alternatively, UE 120 may transfer one or more other packets, relating to the one or more packets, in connection with transferring the one or more packets. For example, UE 120 may provide a packet conveying an SDAP flow identifier or another flow identifier (e.g., a tuple) to enable decoding of a PDCP payload associated with the one or more packets. Additionally, or alternatively, UE 120 may perform another reordering or packet delivery action based at least in part on a type of data traffic flow associated with the one or more packets.

As indicated above, FIG. 4 is provided as an example. Other examples may differ from what is described with respect to FIG. 4.

Figure 5:
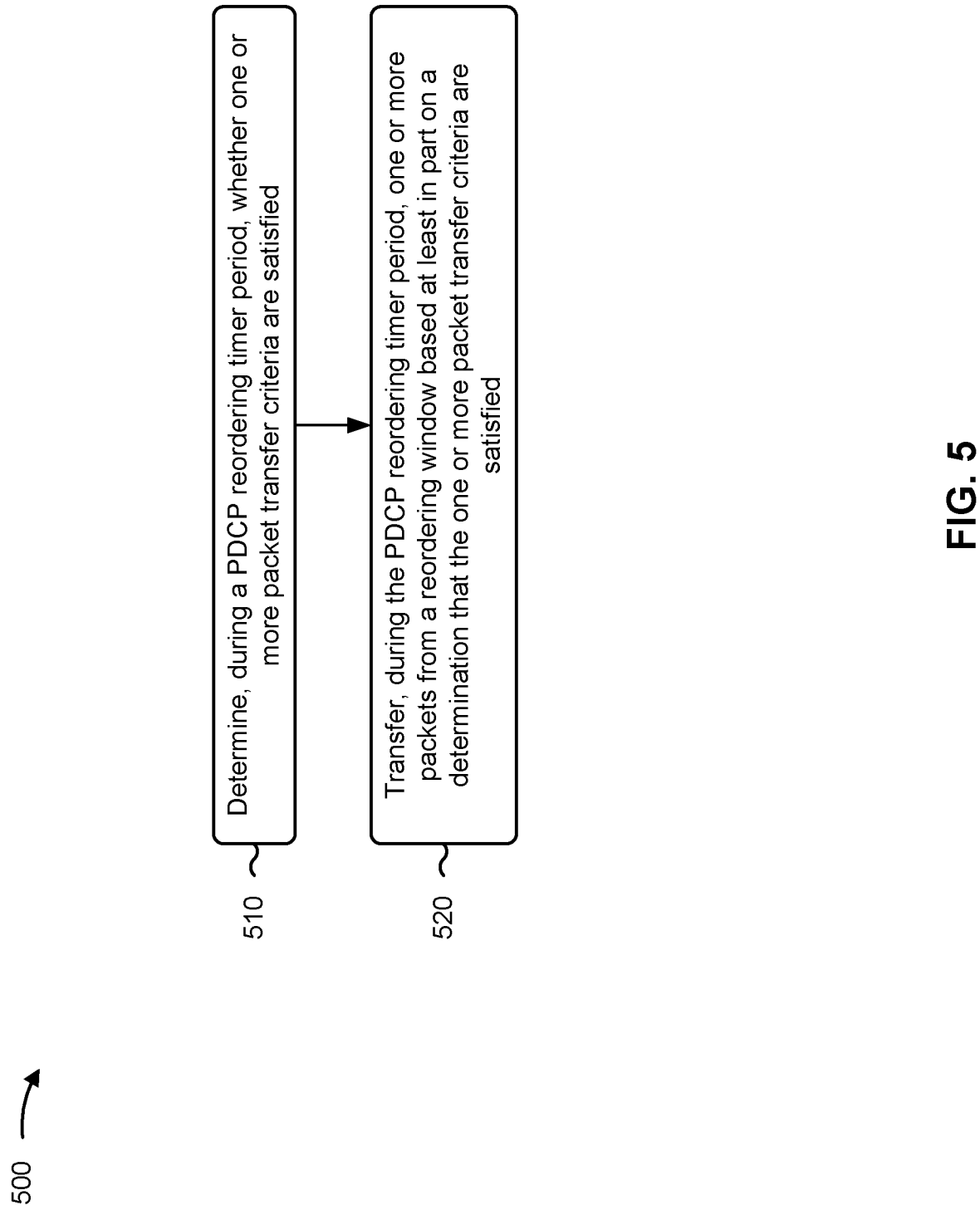
FIG. 5 is a diagram illustrating an example process associated with PDCP reordering configuration, in accordance with the present disclosure.

FIG. 5 is a diagram illustrating an example process 500 performed, for example, by a UE, in accordance with the present disclosure. Example process 500 is an example where the UE (e.g., UE 120) performs operations associated with techniques for improving packet data convergence protocol reordering configuration.

As shown in FIG. 5, in some aspects, process 500 may include determining, during a PDCP reordering timer period, whether one or more packet transfer criteria are satisfied (block 510). For example, the UE (e.g., using determination component 608, depicted in FIG. 6) may determine, during a PDCP reordering timer period, whether one or more packet transfer criteria are satisfied, as described above.

As further shown in FIG. 5, in some aspects, process 500 may include transferring, during the PDCP reordering timer period, one or more packets from a reordering window based at least in part on a determination that the one or more packet transfer criteria are satisfied (block 520). For example, the UE (e.g., using packet transfer component 610, depicted in FIG. 6) may transfer, during the PDCP reordering timer period, one or more packets from a reordering window based at least in part on a determination that the one or more packet transfer criteria are satisfied, as described above.

Process 500 may include additional aspects, such as any single aspect or any combination of aspects described below and/or in connection with one or more other processes described elsewhere herein.

In a first aspect, determining whether the one or more packet transfer criteria are satisfied includes determining whether a first size of the PDCP reordering timer exceeds a second size of a flow characteristic parameter by a size threshold.

In a second aspect, alone or in combination with the first aspect, the flow characteristic parameter is at least one of a jitter parameter, a packet delay parameter, or a latency parameter.

In a third aspect, alone or in combination with one or more of the first and second aspects, determining whether the one or more packet transfer criteria are satisfied includes determining whether a loss recovery procedure is configured for the one or more packets.

In a fourth aspect, alone or in combination with one or more of the first through third aspects, the loss recovery procedure uses at least one of forward error correction, a network coding, or fountain codes.

In a fifth aspect, alone or in combination with one or more of the first through fourth aspects, determining whether the one or more packet transfer criteria are satisfied includes determining whether a type of data traffic, of the one or more packets, matches a specified type of data traffic.

In a sixth aspect, alone or in combination with one or more of the first through fifth aspects, transferring the one or more packets includes transferring the one or more packets based at least in part on at least one of a latency characteristic of the one or more packets, or a reliability characteristic of the one or more packets.

In a seventh aspect, alone or in combination with one or more of the first through sixth aspects, process 500 includes detecting, based at least in part on a set of sequence numbers of a set of received packets, a missed packet of a sequence of packets, and starting the PDCP reordering timer period based at least in part on the detection of the missed packet, and determining whether the one or more packet transfer criteria are satisfied includes determining that the missed packet has not been recovered within a threshold period of time of starting the PDCP reordering timer.

In an eighth aspect, alone or in combination with one or more of the first through seventh aspects, determining whether the one or more packet transfer criteria are satisfied includes determining whether the one or more packet transfer criteria are satisfied based at least in part on at least one of a quality of service identifier, a guaranteed bit rate parameter, an aggregated maximum bit rate parameter, a reliability parameter, or a received host indication.

In a ninth aspect, alone or in combination with one or more of the first through eighth aspects, process 500 includes providing a set of packets associated with a particular data flow based at least in part on the determination of whether the one or more packet transfer criteria are satisfied.

In a tenth aspect, alone or in combination with one or more of the first through ninth aspects, the particular data flow is determined based at least in part on at least one of a flow identifier, a traffic identifier, or a payload.

In an eleventh aspect, alone or in combination with one or more of the first through tenth aspects, process 500 includes determining one or more flow characteristics based at least in part on a packet parameter of at least one packet, and determining whether the one or more packet transfer criteria are satisfied includes determining whether the one or more packet transfer criteria are satisfied based at least in part on the one or more flow characteristics.

In a twelfth aspect, alone or in combination with one or more of the first through eleventh aspects, the packet parameter includes at least one of a PDCP header, a service data adaptation protocol header, an internet protocol tuple, or a robust header compression parameter.

In a thirteenth aspect, alone or in combination with one or more of the first through twelfth aspects, transferring one or more packets from the reordering window includes delivering a first subset of packets from the reordering window while an order of a second subset of packets from the reordering window is maintained, where the first subset of packets occurs within a sequence of the order of the second subset of packets.

In a fourteenth aspect, alone or in combination with one or more of the first through thirteenth aspects, the first subset of packets is selected based at least in part on the one or more packet transfer criteria.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
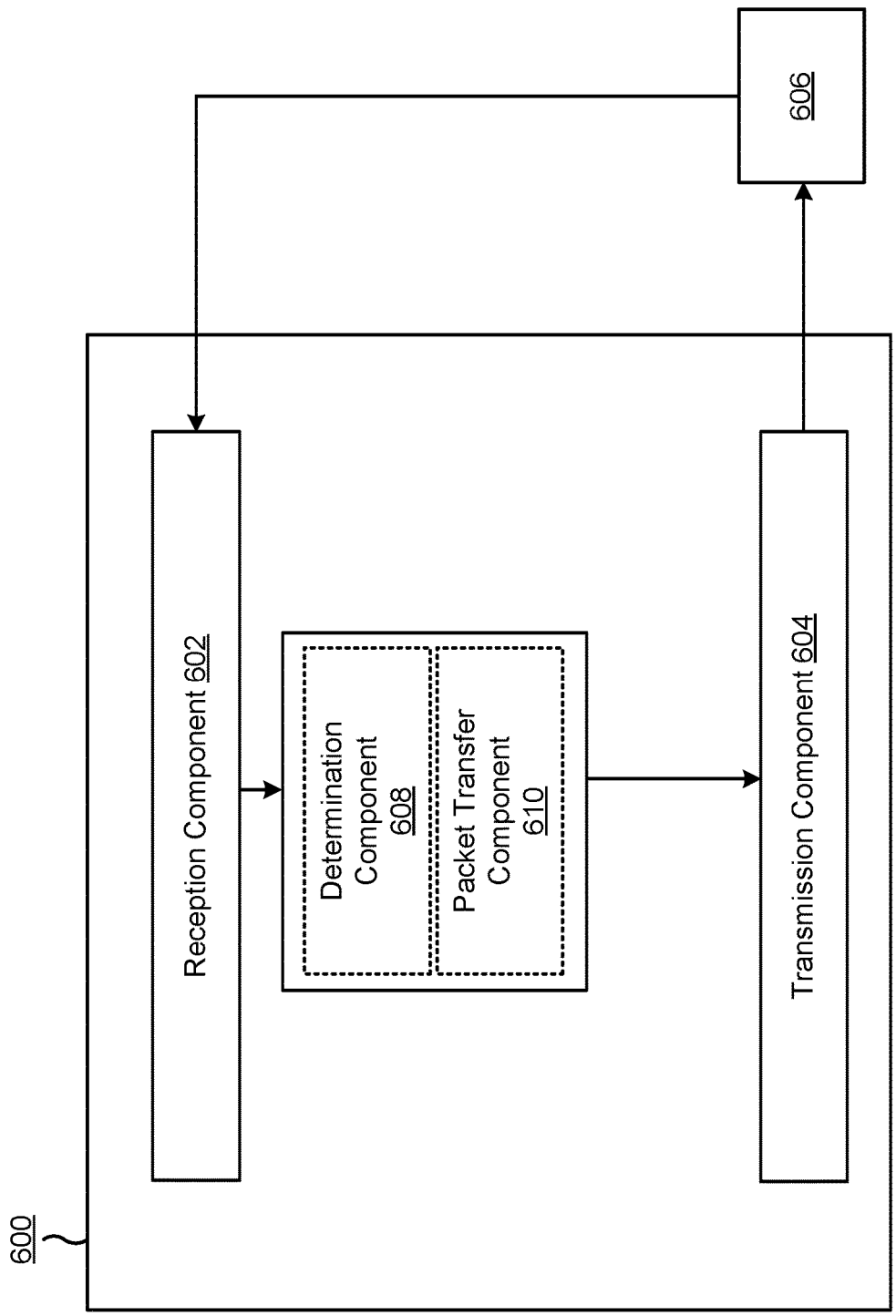
FIG. 6 is a block diagram of an example apparatus for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a determination component 608 or a packet transfer component 610, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The determination component 608 may determine, during a PDCP reordering timer period, whether one or more packet transfer criteria are satisfied. In some aspects, the determination component 608 may include a receive processor, a transmit processor, a controller/processor, a memory, or a combination thereof, of the UE described above in connection with FIG. 2. The packet transfer component 610 may transfer, during the PDCP reordering timer period, one or more packets from a reordering window based at least in part on a determination that the one or more packet transfer criteria are satisfied. In some aspects, the packet transfer component 610 may include one or more antennas, a demodulator, a MIMO detector, a receive processor, a modulator, a transmit MIMO processor, a transmit processor, a controller/processor, a memory, or a combination thereof, of the UE described above in connection with FIG. 2. In some aspects, the packet transfer component 610 may provide one or more other packets, in connection with the one or more packets, such as based at least in part on a flow characteristic of the one or more packets.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a user equipment (UE), comprising: determining, during a packet data convergence protocol (PDCP) reordering timer period, whether one or more packet transfer criteria are satisfied; and transferring, during the PDCP reordering timer period, one or more packets from a reordering window based at least in part on a determination that the one or more packet transfer criteria are satisfied.

Aspect 2: The method of Aspect 1, wherein transferring one or more packets from the reordering window comprises: delivering a first subset of packets from the reordering window while an order of a second subset of packets from the reordering window is maintained, wherein the first subset of packets occurs within a sequence of the order of the second subset of packets.

Aspect 3: The method of any of Aspects 1 to 2, wherein the first subset of packets is selected based at least in part on the one or more packet transfer criteria.

Aspect 4: The method of any of Aspects 1 to 3, wherein determining whether the one or more packet transfer criteria are satisfied comprises: determining whether a first size of the PDCP reordering timer exceeds a second size of a flow characteristic parameter by a size threshold.

Aspect 5: The method of Aspect 4, wherein the flow characteristic parameter is at least one of: a jitter parameter, a packet delay parameter, or a latency parameter.

Aspect 6: The method of any of Aspects 1 to 5, wherein determining whether the one or more packet transfer criteria are satisfied comprises: determining whether a loss recovery procedure is configured for the one or more packets.

Aspect 7: The method of Aspect 6, wherein the loss recovery procedure uses at least one of: forward error correction, a network coding, or a fountain codes.

Aspect 8: The method of any of Aspects 1 to 7, wherein determining whether the one or more packet transfer criteria are satisfied comprises: determining whether a type of data traffic, of the one or more packets, matches a specified type of data traffic.

Aspect 9: The method of any of Aspects 1 to 8, wherein transferring the one or more packets comprises: transferring the one or more packets based at least in part on at least one of: a latency characteristic of the one or more packets, or a reliability characteristic of the one or more packets.

Aspect 10: The method of any of Aspects 1 to 9, further comprising: detecting, based at least in part on a set of sequence numbers of a set of received packets, a missed packet of a sequence of packets; starting the PDCP reordering timer period based at least in part on the detection of the missed packet; and wherein determining whether the one or more packet transfer criteria are satisfied comprises: determining that the missed packet has not been recovered within a threshold period of time of starting the PDCP reordering timer.

Aspect 11: The method of any of Aspects 1 to 10, wherein determining whether the one or more packet transfer criteria are satisfied comprises: determining whether the one or more packet transfer criteria are satisfied based at least in part on at least one of: a quality of service identifier, a guaranteed bit rate parameter, an aggregated maximum bit rate parameter, a reliability parameter, or a received host indication.

Aspect 12: The method of any of Aspects 1 to 11, further comprising: providing a set of packets associated with a particular data flow based at least in part on the determination of whether the one or more packet transfer criteria are satisfied.

Aspect 13: The method of Aspect 12, wherein the particular data flow is determined based at least in part on at least one of a flow identifier, a traffic identifier, or a payload.

Aspect 14: The method of any of Aspects 1 to 13, further comprising: determining one or more flow characteristics based at least in part on a packet parameter of at least one packet; and wherein determining whether the one or more packet transfer criteria are satisfied comprises: determining whether the one or more packet transfer criteria are satisfied based at least in part on the one or more flow characteristics.

Aspect 15: The method of Aspect 14, wherein the packet parameter includes at least one of: a PDCP header, a service data adaptation protocol header, an internet protocol tuple, or a robust header compression parameter.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
transfer, before a packet data convergence protocol (PDCP) reordering timer period has elapsed and from a reordering window, an incomplete sequence of one or more packets,
wherein the UE transfers the incomplete sequence of the one or more packets before the PDCP reordering timer period has elapsed after determining that one or more packet transfer criteria are satisfied, the one or more packet transfer criteria including one or more of:
a relative size of the PDCP reordering timer period to one or more time periods;
a presence of a loss recovery procedure for the one or more packets;
a type of data traffic associated with the one or more packets; or
a traffic flow characteristic associated with the one or more packets, wherein the traffic flow characteristic is a traffic type, a service data adaptation protocol (SDAP) header, tuple information, a bit rate, or a header compression traffic characteristic.

2. The UE of claim 1, wherein the one or more processors, to transfer the one or more packets, are configured to:
deliver a first subset of packets from the reordering window while an order of a second subset of packets from the reordering window is maintained, wherein the first subset of packets occurs within a sequence of the order of the second subset of packets.

3. The UE of claim 2, wherein the first subset of packets is selected based at least in part on the one or more packet transfer criteria.

4. The UE of claim 1, wherein the one or more processors, to determine whether the one or more packet transfer criteria are satisfied, are configured to:
determine whether a first size of the PDCP reordering timer period exceeds a second size of a flow characteristic parameter by a size threshold.

5. The UE of claim 4, wherein the flow characteristic parameter is at least one of:
a jitter parameter,
a packet delay parameter, or
a latency parameter.

6. The UE of claim 1, wherein the one or more processors, to determine whether the one or more packet transfer criteria are satisfied, are configured to:
determine whether the loss recovery procedure is configured for the one or more packets.

7. The UE of claim 6, wherein the loss recovery procedure uses at least one of: forward error correction, a network coding, or a fountain codes.

8. The UE of claim 1, wherein the one or more processors, to determine whether the one or more packet transfer criteria are satisfied, are configured to:
determine whether the type of data traffic, associated with the one or more packets, matches a specified type of data traffic.

9. The UE of claim 1, wherein the one or more processors, to transfer the one or more packets, are configured to:
transfer the one or more packets based at least in part on at least one of:
a latency characteristic of the one or more packets, or
a reliability characteristic of the one or more packets.

10. The UE of claim 1, wherein the one or more processors are further configured to:
detect, based at least in part on a set of sequence numbers of a set of received packets, a missed packet of a sequence of packets;
start the PDCP reordering timer period based at least in part on the detection of the missed packet; and
wherein the one or more processors, to determine whether the one or more packet transfer criteria are satisfied, are configured to:
determine that the missed packet has not been recovered within a threshold period of time of starting the PDCP reordering timer period.

11. The UE of claim 1, wherein the one or more processors, to determine whether the one or more packet transfer criteria are satisfied, are configured to:
determine whether the one or more packet transfer criteria are satisfied based at least in part on at least one of:
a quality of service identifier,
a guaranteed bit rate parameter, an aggregated maximum bit rate parameter, a reliability parameter, or
a received host indication.

12. The UE of claim 1, wherein the one or more processors are further configured to:
provide a set of packets associated with a particular data flow based at least in part on determining whether the one or more packet transfer criteria are satisfied.

13. The UE of claim 12, wherein the particular data flow is determined based at least in part on at least one of a flow identifier, a traffic identifier, or a payload.

14. The UE of claim 1, wherein the one or more processors are further configured to:
determine one or more flow characteristics based at least in part on a packet parameter of at least one packet; and
wherein the one or more processors, to determine whether the one or more packet transfer criteria are satisfied, are configured to:
determine whether the one or more packet transfer criteria are satisfied based at least in part on the one or more flow characteristics.

15. The UE of claim 14, wherein the packet parameter includes at least one of:
a PDCP header, a service data adaptation protocol header, an internet protocol tuple, or
a robust header compression parameter.

16. A method of wireless communication performed by a user equipment (UE), comprising:

transferring, before a packet data convergence protocol (PDCP) reordering timer period has elapsed and from a reordering window, an incomplete sequence of one or more packets,
   wherein the UE transfers the incomplete sequence of the one or more packets before the PDCP reordering timer period has elapsed after determining that one or more packet transfer criteria are satisfied, the one or more packet transfer criteria including one or more of:
      a relative size of the PDCP reordering timer period to one or more time periods;
      a presence of a loss recovery procedure for the one or more packets;
      a type of data traffic associated with the one or more packets; or
      a traffic flow characteristic associated with the one or more packets, wherein the traffic flow characteristic is a traffic type, a service data adaptation protocol (SDAP) header, tuple information, a bit rate, or a header compression traffic characteristic.

17. The method of claim 16, wherein transferring the one or more packets comprises:
   delivering a first subset of packets from the reordering window while an order of a second subset of packets from the reordering window is maintained, wherein the first subset of packets occurs within a sequence of the order of the second subset of packets.

18. The method of claim 17, wherein the first subset of packets is selected based at least in part on the one or more packet transfer criteria.

19. The method of claim 16, wherein determining whether the one or more packet transfer criteria are satisfied comprises:
   determining whether a first size of the PDCP reordering timer period exceeds a second size of a flow characteristic parameter by a size threshold.

20. The method of claim 19, wherein the flow characteristic parameter is at least one of:
   a jitter parameter,
   a packet delay parameter, or
   a latency parameter.

21. The method of claim 16, wherein determining whether the one or more packet transfer criteria are satisfied comprises:
   determining whether the loss recovery procedure is configured for the one or more packets.

22. The method of claim 21, wherein the loss recovery procedure uses at least one of: forward error correction, a network coding, or a fountain codes.

23. The method of claim 16, wherein determining whether the one or more packet transfer criteria are satisfied comprises:
   determining whether the type of data traffic, associated with the one or more packets, matches a specified type of data traffic.

24. The method of claim 16, wherein transferring the one or more packets comprises:
   transferring the one or more packets based at least in part on at least one of:
      a latency characteristic of the one or more packets, or
      a reliability characteristic of the one or more packets.

25. The method of claim 16, further comprising:
   detecting, based at least in part on a set of sequence numbers of a set of received packets, a missed packet of a sequence of packets;
   starting the PDCP reordering timer period based at least in part on the detection of the missed packet; and
   wherein determining whether the one or more packet transfer criteria are satisfied comprises:
      determining that the missed packet has not been recovered within a threshold period of time of starting the PDCP reordering timer period.

26. The method of claim 16, wherein determining whether the one or more packet transfer criteria are satisfied comprises:
   determining whether the one or more packet transfer criteria are satisfied based at least in part on at least one of:
      a quality of service identifier, a guaranteed bit rate parameter, an aggregated maximum bit rate parameter, a reliability parameter, or
      a received host indication.

27. The method of claim 16, further comprising:
   providing a set of packets associated with a particular data flow based at least in part on determining whether the one or more packet transfer criteria are satisfied.

28. The method of claim 27, wherein the particular data flow is determined based at least in part on at least one of a flow identifier, a traffic identifier, or a payload.

29. A non-transitory computer-readable medium storing a set of instructions for wireless communication, the set of instructions comprising:
   one or more instructions that, when executed by one or more processors of a user equipment (UE), cause the UE to:
      transfer, before a packet data convergence protocol (PDCP) reordering timer period has elapsed and from a reordering window, an incomplete sequence of one or more packets,
         wherein the UE transfers the incomplete sequence of the one or more packets before the PDCP reordering timer period has elapsed after determining that one or more packet transfer criteria are satisfied, the one or more packet transfer criteria including one or more of:
            a relative size of the PDCP reordering timer period to one or more time periods;
            a presence of a loss recovery procedure for the one or more packets;
            a type of data traffic associated with the one or more packets; or
            a traffic flow characteristic associated with the one or more packets, wherein the traffic flow characteristic is a traffic type, a service data adaptation protocol (SDAP) header, tuple information, a bit rate, or a header compression traffic characteristic.

30. An apparatus for wireless communication, comprising:
   means for transferring, before a packet data convergence protocol (PDCP) reordering timer period has elapsed and from a reordering window, an incomplete sequence of one or more packets,
      wherein the apparatus transfers the incomplete sequence of the one or more packets before the PDCP reordering timer period has elapsed after determining that one or more packet transfer criteria are satisfied, the one or more packet transfer criteria including one or more of:
         a relative size of the PDCP reordering timer period to one or more time periods;

a presence of a loss recovery procedure for the one or more packets;
a type of data traffic associated with the one or more packets; or
a traffic flow characteristic associated with the one or more packets, wherein the traffic flow characteristic is a traffic type, a service data adaptation protocol (SDAP) header, tuple information, a bit rate, or a header compression traffic characteristic.

* * * * *